UNITED STATES PATENT OFFICE.

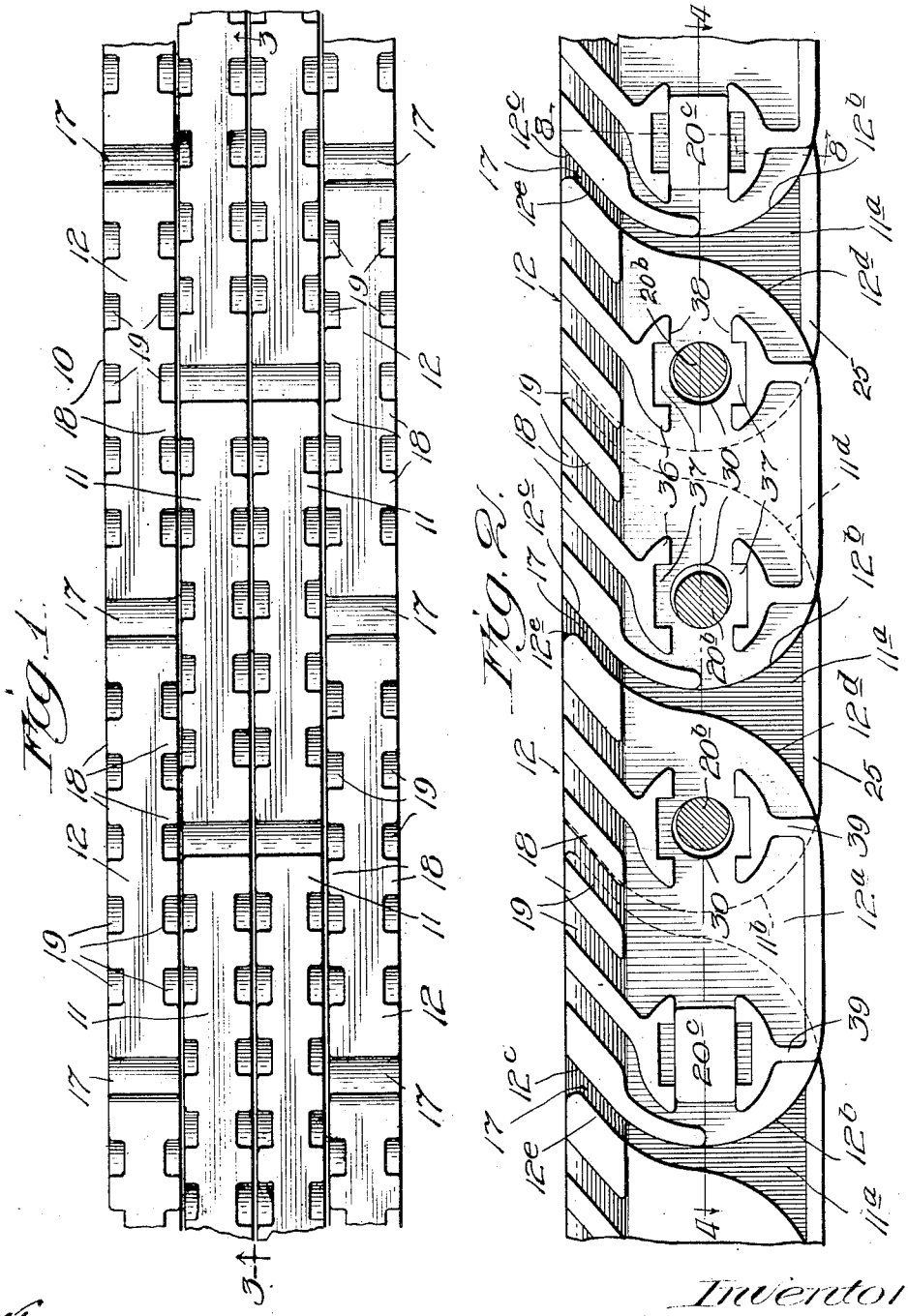

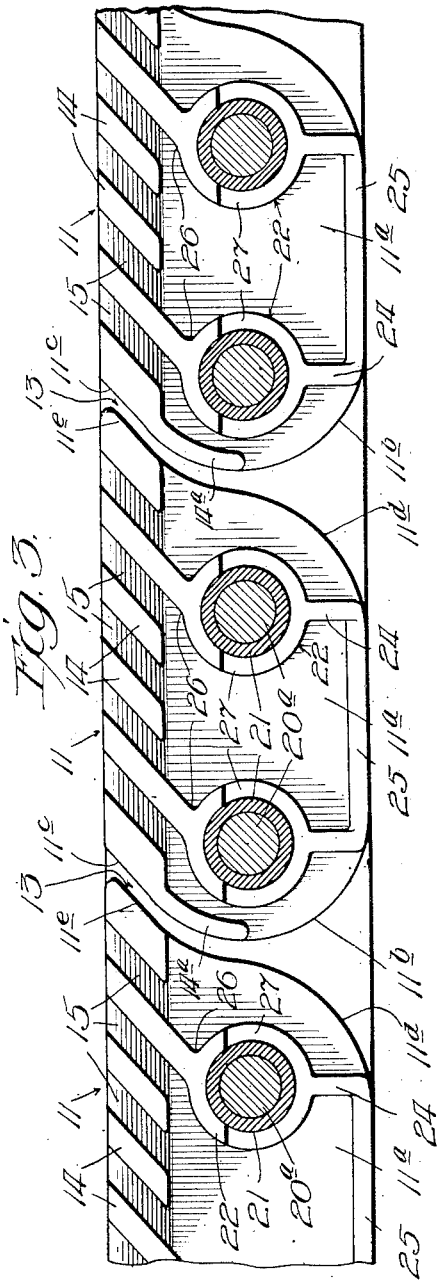
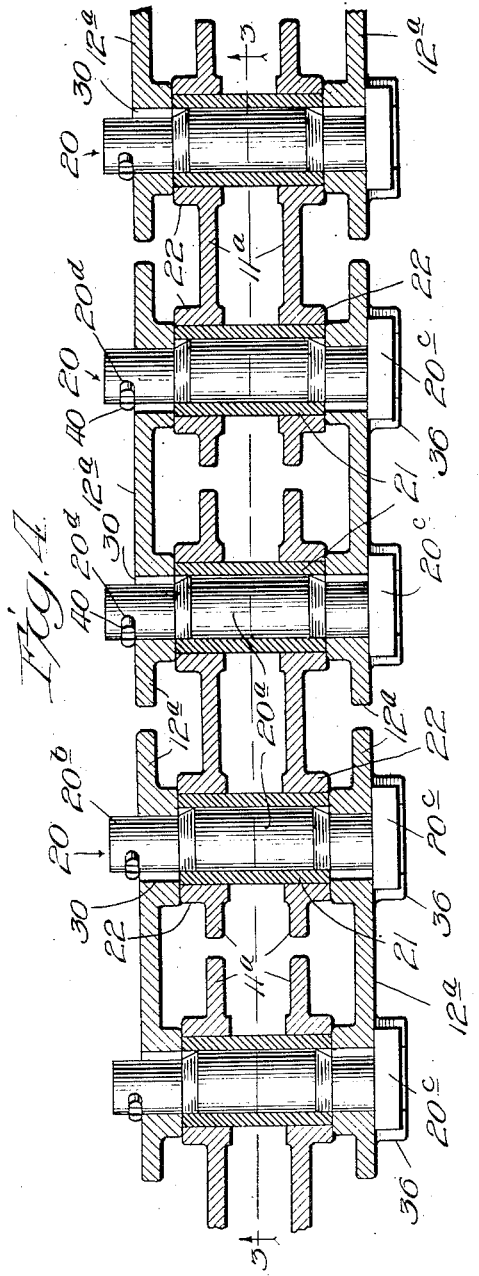

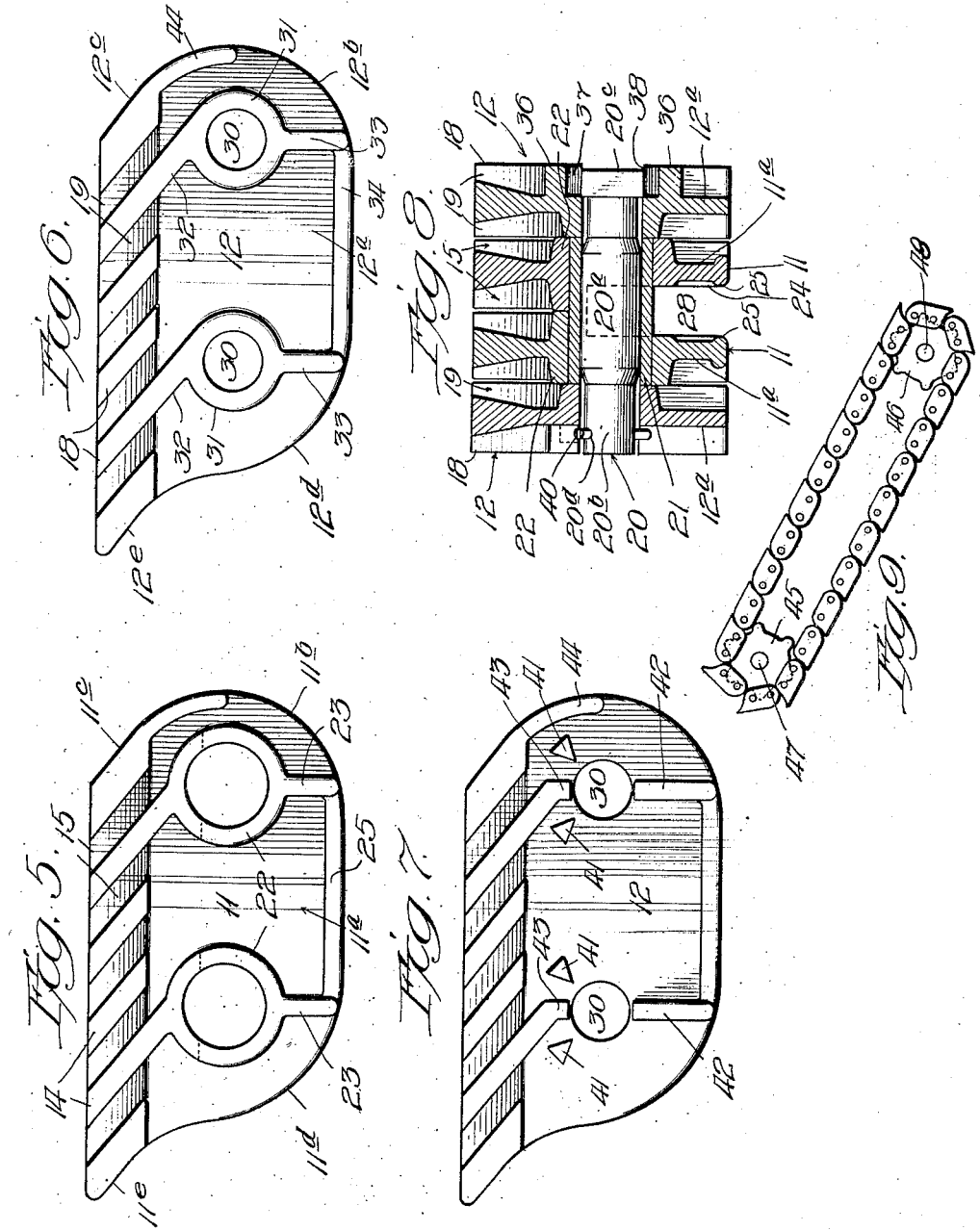

LOYD R. STOWE, OF MAPLEWOOD, MISSOURI.

GRATE-CHAIN.

1,379,135. Specification of Letters Patent. Patented May 24, 1921.

Application filed May 24, 1919. Serial No. 299,661.

*To all whom it may concern:*

Be it known that I, LOYD R. STOWE, a citizen of the United States, residing at Maplewood, in the county of St. Louis and State of Missouri, have invented certain new and useful Improvements in Grate - Chains, of which the following is a specification.

This invention relates to a chain adapted for use as a grate element in a stoker, and the purpose of the invention is to provide a chain comprising a plurality of elements which are relatively adjustable to permit variation in the length of the chain. Where a series of grate chains are arranged side by side, it frequently happens that the chains are of unequal length after continued use which makes it impossible to effect a uniform feed of the fuel over the grate. The principal object of the present invention is to provide a grate composed of a plurality of chains, which may, if desired, be combined with other grate elements, and to provide means whereby the length of each chain may be adjusted independently of the other chains, so that all of the chains may be maintained at a uniform tightness with their upper fuel bearing surfaces in the same plane. This improvement is effected by providing a grate chain composed of a plurality of links which are connected together by rotatable pins adapted to assume different positions in order to adjust the relative positions of the connected links. Other objects relate to various features of construction and arrangement which will appear more fully hereinafter.

The nature of the invention will be understood from the following specification, taken with the accompanying drawings, in which one embodiment is illustrated.

In the drawings—

Figure 1 shows a top plan view of a portion of a grate chain in which my invention is embodied;

Fig. 2 is a side elevation of the grate chain illustrated in Fig. 1;

Fig. 3 is a longitudinal sectional view taken on the line 3—3 of Fig. 1;

Fig. 4 is a horizontal sectional view taken on the line 4—4 of Fig. 2, the connecting pins and bushings being shown in the plan;

Fig. 5 is a side elevation of the outer side of one of the inner links;

Fig. 6 is a side elevation of the inner side of one of the outer links;

Fig. 7 is a side elevation of the outer side of one of the left hand outer links;

Fig. 8 is a sectional view on the line 8—8 of Fig. 2; and

Fig. 9 is a side elevation of a chain embodying the present invention and mounted on rotatable shafts.

In the embodiment illustrated the grate chain is made up of two rows of inner links 11 and two rows of outer links 12, the links of the inner rows being arranged side by side with the links of the outer rows disposed opposite each other and overlapping the ends of the inner links. Each of the inner links 11 comprises a plate $11^a$ which is provided with a substantially semi-circular surface $11^b$ at the rear end thereof, this surface terminating adjacent the upper part of the link in an inclined surface $11^c$. The forward end of each link 11 is provided with an arcuate surface $11^d$ on the lower part thereof and with a projection $11^e$ adjacent the upper part thereof, the surface of the projection $11^e$ being adapted to lie parallel to the inclined end surface at the rear end of the adjacent link, whereby an intermediate air circulating aperture 13 is formed. The plate $11^a$ has a flat upper surface and is provided with a plurality of laterally extending lugs or flanges 14 located along the upper edge of the link. These flanges 14 are spaced apart to form intervening air spaces or grooves 15, and they are inclined with respect to the longitudinal axis of the link, so that when the chain is mounted in its normal position on the grate, the air spaces 15 will lie in substantially horizontal planes. When the center links are mounted side by side, as illustrated in Fig. 1, the grooves 15 of adjacent links are adapted to register with each other.

The outer links 12 comprise plates $12^a$ which are similarly provided with curved end surfaces $12^b$ and $12^d$, the surface $12^b$ terminating in an inclined surface $12^c$, and the surface $12^d$ terminating in an inclined surface on the projection $12^e$, so that intervening air spaces 17 are formed between the ends of the alining links. Inclined flanges 18 extend laterally from the plate 12$^a$ on the upper edge thereof, forming intervening air spaces 19 which are adapted to lie in planes parallel to the planes occupied by the air spaces 15 in the links 11.

The links 11 and 12 are connected together by pins 20 which are provided with cylindrical central portions 20$^a$ and eccentrically located cylindrical end portions 20$^b$. The central portions 20$^a$ of the pins are journaled in bushings 21, and these bushings are rotatably mounted in the apertured bosses 22 which extend laterally from opposite sides of the plates 11$^a$. On the outer sides of the links 11, ribs 23 extend downwardly from the bosses 22 with their outer surfaces in alinement with the outer surfaces of the bosses, and on the inner sides of the links 11 other ribs 24 extend downwardly from the bosses 22 in alinement with the ribs 23. The lower edge of the link is provided with a reinforcing rib 25 between the pairs of ribs 23 and 24 at opposite ends of the links. The bosses 22 on the inner sides of the links are connected to two of the ribs 14, as shown at 26, and the end surfaces of these bosses on opposite links are adapted to coact with each other. The lower portions of the bosses 22 on the inner sides of the links are cut away as shown at 27, and the end surfaces of the ribs 24 are in alinement with the end surfaces of these cutaway portions of the bosses, so that intervening spaces 28 are formed between the lower portions of each pair of inner links, these spaces 28 being adapted to receive the teeth of the sprocket gears upon which the chain is mounted, so that these teeth coact with the bushings 21 during the travel of the chain. The inclined flanges 14 at the rear end of each inner link are preferably extended downwardly, as shown at 14$^a$, thus preventing ash from falling through the chain when the air space is enlarged by reason of the grate chain passing around the lower sprocket wheel 46, hereinafter described.

The outer links 12 are provided with circular apertures 30 adapted to receive the end portions 20$^b$ of the connecting pins 20. The inner sides of the outer links of each row are provided on their inner sides with circular bosses 31 located around the apertures 30 and connected to two of the flanges 18 by ribs 32. Ribs 33 extend downwardly on the lower parts of the bosses 31, and the lower edge of the plate 12$^a$ is reinforced between the ribs 33 by a rib 34. The end surfaces of the bosses 31 and of the ribs 32 are adapted to coact with the surfaces of the bosses 22 and ribs 23 formed on the outer sides of the inner links, and the bosses 31 also engage the end surfaces of the bushings 21 to prevent lateral movement thereof. The outer side of each of the outer links at the right hand side of the chain is provided with a pair of lugs 36 which are located above and below the apertures 30. These lugs have rectangular recesses 37 formed therein in vertical alinement with each other, and these recesses are adapted to engage the ends of the oblong rectangular head 20$^c$ formed on the connecting pin 20. When the head 20$^c$ is turned through an angle of ninety degrees, it is adapted to fit between the oppositely disposed faces 38 of the lugs 36, and these lugs are therefore adapted to hold the pins 20 against angular movement when they are in any one of four different positions. The upper lugs 23 are connected to two of the flanges 18, and the lower lugs 36 have ribs 39 extending downwardly therefrom in alinement with the ribs 33.

The projecting ends of the connecting pins 20, opposite the heads 20$^c$, are provided with apertures 20$^d$ adapted to be engaged by cotter pins 40, and the outer side of each link in the left hand row of the outer links is provided with projecting V-shaped lugs 41, which are adapted to engage and separate the ends of the cotter pins, as shown in Fig. 7. Ribs 42 extend downwardly from the apertures 30, below the lugs 41, and two of the ribs 18 are extended downwardly to the upper sides of the apertures 30, as shown at 43. At the rear end of each of the outer links, one of the flanges 18 is extended downwardly and partially around the end of the link, as shown at 44.

When the connecting pins are in position and secured by the cotter pins 40, the links 11 and 12 are securely held in assembled relation, and relative lateral movement of the connecting links is prevented by the coacting bosses and ribs. The apertures 30 in the outer links are of sufficient size to permit the central portions 20$^a$ of the connecting pins to pass therethrough, and when the links of the chain are assembled, the end portions 20$^b$ of the pins coact with those surfaces of the apertures 30 which are adjacent the ends of the outer links, as illustrated in Fig. 4, this normal relation of the pins with respect to the apertures 30 being maintained by the tension in the chain. The completed endless chain formed of the links, herein described, is adapted to be mounted on sprocket gears 45 and 46 which are secured to the upper and lower shafts 47 and 48, respectively, so that the upper stretch of the chain occupies an inclined position with the ventilating spaces 15 and 19 of the links lying in horizontal planes, so that the passage of fuel through the chain is prevented. The teeth of the sprocket gears project into the spaces 28, which are formed between the lower portions of each pair of inner links, and co-act with the rotatable bushings 21, so that the rotation of one of the shafts by suitable driving means will serve to maintain a continuous movement of the flexible chain. In the usual chain grate stoker a large number of grate chains are mounted side by side, and in order to prevent the formation of pockets and depressions in the composite grate surface and to maintain a positive and and uniform feed of fuel over the entire area of the grate, it is necessary to secure the same degree of tension in each chain of the grate, so that the upper surfaces of the chains will lie substantially in one plane. This desirable result is effected by adjusting the connecting pins 20, so that the eccentrically located parts 20$^a$ and 20$^b$ thereof will effect a relative movement of the inner links 11 with respect to the outer links 12, and thereby regulate the length of the chain. The axis of eccentricity of each pin is preferably located in the same plane as the longitudinal axis of the head 20$^c$ of the pin, so that when the heads 20$^c$ are all in the positions illustrated in Fig. 2, the chain is either expanded to its greatest length or contracted to its shortest length. Intermediate lengths of chain can be secured by rotating the pins ninety degrees in either direction and seating the head thereof in the recesses 37. When the pins are in the last-mentioned positions, the relative positions of the parts 20$^a$ and 20$^b$ of the pins will cause the upper surfaces of the inner links 11 to be out of alinement with the upper surfaces of the outer links 12, but this slight variation does not interfere with the effective operation of the grate chain. The eccentricity of each pin is preferably so designed with respect to the number of links and the length of the endless chain that the adjustment of all of the pins from one extreme position to the other will effect a shortening of the entire chain an amount equal to the length of one link. An important feature of the invention is the bushing construction which is valuable in maintaining the initial length of the assembled chains, since these bushings extend completely through the inner links and take up all of the wear due to the relative angular movements of the links, the pins being held against rotation with respect to the outer links. In addition to providing a wide wearing surface for the links, the bushings provide surfaces upon which the teeth of the sprocket wheel drive. These bushings may rotate slowly at times upon the steel pins, and the wear of the teeth of the sprockets, instead of being confined at one end in each bushing, is distributed around the surface of each bushing. This construction takes all of the strain or pressure of the sprocket teeth off of the links, allowing the links to rotate freely with the pin as the chains break over the idler sprockets at the lower end of the grate. The bushings are closed at their ends by the bosses which are formed on the inner sides of the outer links, and the use of these bushings which are closed in this manner is of advantage when burning coals which contain soluble salts adapted to be dissolved by excessive moisture or water in the coal, thus forming a solution which forms a scale on the links of the chain. This scale cannot enter the bushings and it cannot do any harm on the outer links inasmuch as the pinions do not rotate with respect to the outer links.

Although I have shown and described a single embodiment of the invention for purposes of illustration, it will be understood that it may be constructed in various other forms without departing from the scope of the appended claims.

What I claim is:

1. The combination in a grate chain, of a series of links, and means for connecting said links to permit relative adjustment thereof.

2. The combination in a stoker, of a plurality of endless grate chains arranged side by side, and means for effecting adjustment of the length of any one of said chains independently of the other chains.

3. The combination in a grate chain, of a plurality of links arranged in rows with the links in one row overlapping the ends of the links in an adjacent row, and means for connecting said overlapping links to permit relative adjustment thereof longitudinally of the chain.

4. The combination in a grate chain, of a plurality of links, and a series of pins for connecting said links, said pins being provided with eccentric parts whereby rotation thereof effects a relative movement of the connecting links.

5. The combination in a grate chain, of a plurality of links arranged in rows with those in one row overlapping those in an adjacent row, the overlapping links being provided with alining apertures, and pins adapted to engage said apertures, said pins being provided with parts which effect relative movement of the connected links upon rotation of said pins.

6. The combination in a grate chain, of a plurality of links arranged in rows with those in one row overlapping those in an adjacent row, the overlapping links being provided with alining apertures, pins adapted to engage said apertures, said pins being provided with parts which effect relative movement of the connected links upon rotation of said pins, and means for normally preventing rotation of said pins.

7. The combination in a grate chain, of a plurality of links arranged in rows with those in one row overlapping those in an adjacent row, the overlapping links being provided with alining apertures, pins adapted to engage said apertures, said pins being provided with parts which effect relative movement of the connected links upon rotation of said pins, and means for securing said pins against rotation in any one of a plurality of adjusted positions.

8. The combination in a grate chain, of a plurality of series of links, the links of adjacent series overlapping, pins for connecting said links, and bushings mounted on said pins and engaging some of said links to provide bearing surfaces for the relative movements of links in adjacent series.

9. The combination in a grate chain, of a series of inner links, two series of outer links arranged on opposite sides of and overlapping said inner links, bushings engaging said inner links, and pins fixed with respect to said outer links and engaging said bushings.

10. The combination in a grate chain, of two series of inner links, two series of outer links arranged in opposite sides of and overlapping said inner links, bushings extending through said inner links and abutting against said outer links, pins passing through said outer links and through said bushings, and means for preventing rotation of said pins with respect to said outer links, said inner links being cut away on their inner sides to receive sprocket teeth adapted to engage said bushings.

11. The combination in a grate chain, of a series of inner links, two series of outer links arranged in opposite sides of and overlapping said inner links, bushings extending through said inner links, and connecting pins engaging said bushings and said outer links, the parts engaging the bushings and the parts engaging the outer links being eccentrically located.

12. The combination in a grate chain, of a series of inner links, two series of outer links arranged on opposite sides of and overlapping said inner links, and connecting pins having parts engaging said inner links and said outer links, the parts engaging the inner links and the parts engaging the outer links being eccentrically located.

13. The combination in a grate chain, of a series of inner links, two series of outer links arranged on opposite sides of and overlapping said inner links, said inner and outer links being provided with alining apertures and connecting pins engaging said apertures, the surfaces of said pins engaging said inner links being eccentrically located with respect to the surfaces of the pins which engage the apertures of the outer links.

14. The combination in a stoker, of sprocket gears, a series of inner links, two series of outer links arranged on opposite sides of and overlapping said inner links, said overlapping links being provided with alining circular apertures, and pins engaging said apertures, said pins being provided with eccentrically located parts adapted to effect relative movement of the connected inner and outer links upon rotation of the pins, said inner links being recessed to permit the teeth of said sprocket gears to enter the spaces between said pins.

15. The combination in a stoker, of sprocket gears, a series of inner links, a series of outer links arranged on opposite sides of and overlapping said inner links, said overlapping links being provided with alining circular apertures, pins engaging said apertures, said pins being provided with eccentrically located parts adapted to effect relative movement of the connected inner and outer links upon rotation of the pins, said inner links being recessed to permit the teeth of said sprocket gears to enter the spaces between said pins, and bushings mounted on said pins to coact with the teeth of said gears.

16. The combination in a grate chain, of two rows of inner links, said links being arranged in pairs side by side, two rows of outer links arranged on opposite sides of and overlapping said inner links, said inner and outer links being provided with laterally projecting coacting parts and with alining apertures, and pins extending through said apertures to secure said links against lateral separation.

17. The combination in a grate chain, of two rows of inner links, said links being arranged in pairs side by side, two rows of outer links arranged on opposite sides of and overlapping said inner links, said inner and outer links being provided with laterally projecting coacting parts and with alining apertures, pins extending through said apertures to secure said links against lateral separation, the parts of said pins which engage the inner links being eccentrically located with respect to the parts which engage the outer links, and means for securing said pins in any one of a plurality of angularly disposed positions.

18. The combination in a grate chain, of two rows of inner links, said links being arranged in pairs side by side, two rows of outer links arranged on opposite sides of and overlapping said inner links, said inner and outer links being provided with laterally projecting coacting parts and with alining apertures, pins extending through said apertures to secure said links against lateral separation, the parts of said pins which engage the inner links being eccentrically located with respect to the parts which engage the outer links, and means for securing said pins in any one of a plurality of angularly disposed positions, the links of the inner and outer series being provided with grooves adapted to permit air to pass through the chain.

In testimony whereof, I have subscribed my name.

LOYD R. STOWE.